US012332101B2

(12) United States Patent
Colombo et al.

(10) Patent No.: US 12,332,101 B2
(45) Date of Patent: Jun. 17, 2025

(54) VALVE ASSEMBLY FOR A GAS METER AND GAS METER USING THE SAME (71) Applicant: METERSIT SRL, Padua (IT)

(72) Inventors: Pierangelo Colombo, Padua (IT); Camillo Fontana, Padua (IT)

(73) Assignee: METERSIT SRL, Padua (IT)

( * ) Notice: Subject to any disclaimer, the term of this patent is extended or adjusted under 35 U.S.C. 154(b) by 283 days.

(21) Appl. No.: 18/249,612

(22) PCT Filed: Oct. 27, 2021

(86) PCT No.: PCT/IB2021/059926
§ 371 (c)(1),
(2) Date: Apr. 19, 2023

(87) PCT Pub. No.: WO2022/090957
PCT Pub. Date: May 5, 2022

(65) Prior Publication Data
US 2023/0384138 A1 Nov. 30, 2023

(30) Foreign Application Priority Data
Oct. 30, 2020 (IT) .......................... 102020000025927

(51) Int. Cl.
G01F 15/00 (2006.01)
G01F 15/14 (2006.01)
G01F 15/18 (2006.01)
(52) U.S. Cl.
CPC ............ *G01F 15/005* (2013.01); *G01F 15/14* (2013.01); *G01F 15/185* (2013.01)
(58) Field of Classification Search
CPC ...... G01F 15/005; G01F 15/14; G01F 15/185; G01F 15/00; G01F 3/00; F16K 5/0663
See application file for complete search history.

(56) References Cited

U.S. PATENT DOCUMENTS 10,295,387 B2 * 5/2019 Bonomi ................ F16K 27/067
2004/0045607 A1 * 3/2004 Lammers ............. F16K 15/063
137/543

(Continued)

FOREIGN PATENT DOCUMENTS

| CN | 113188618 A | * 7/2021 | ............. G01F 1/662 |
| LU | 88731 A1 | 10/1996 | |
| WO | 2019/244022 A1 | 12/2019 | |

OTHER PUBLICATIONS

International Search Report and Written Opinion issued on Feb. 2, 2022, in corresponding International application No. PCT/IB2021/059926; 11 pages.

*Primary Examiner* — Francis C Gray
(74) *Attorney, Agent, or Firm* — Maier & Maier, PLLC (57) ABSTRACT A gas meter and a valve assembly, the gas meter including a box-shaped casing defining measuring compartment and including an inlet and outlet section for a gas stream. The meter further includes a gas stream measuring device, arranged inside the measuring compartment and a valve assembly housed inside the measuring compartment and connected to the inlet section. The valve assembly includes a valve body accommodating a shutter element cooperating with a sealing element having an inner diameter defining a passage opening of the gas stream through the valve body, the shutter element movable between an open position and a closed position of the gas stream passage opening. The valve assembly further includes a connecting element, in flow communication with the inlet section and the valve body to which it is connected, including a stream conveyor device and extending between an upper end and lower end portion thereof.

12 Claims, 4 Drawing Sheets (56) References Cited

U.S. PATENT DOCUMENTS

2018/0329435 A1* 11/2018 Chalfin .................... F16K 3/14
2021/0278266 A1* 9/2021 Rømer ................. F16K 31/535

* cited by examiner

VALVE ASSEMBLY FOR A GAS METER AND GAS METER USING THE SAME

TECHNICAL FIELD

The present invention relates to the field of fluid measuring devices. In particular, the invention relates to a valve assembly and a gas meter using the same.

BACKGROUND

As is well known, gas meters are used for measuring the amount of gas supplied to a user and comprise an inlet duct for the connection to the gas distribution network, and an outlet duct for the connection to the user. A gas meter generally comprises a box-shaped casing connected to the inlet and outlet ducts, inside which a device for measuring the stream of gas supplied as well as a valve unit are arranged, which controls the inflow of gas to the meter and, consequently, the delivery of gas through the meter to the user placed downstream of the meter.

In such devices, it is of paramount importance to ensure that the gas stream measurement is accurate and reliable over time, and therefore to arrange control instruments on the measuring devices used, but also to monitor the operation of the valve element, as the correct operation of such an element directly affects the measurement activity.

In such a context, one of the problems normally encountered is fouling inside the meter due to the presence of dust or other solid residues present in the gas pipes, which are found in the gas stream and transported by the same into the meter. In particular, dust and lighter corpuscles can be suspended in the gas stream and move therewith, while larger corpuscles can rest by gravity on the lower walls of the ducts and slowly be pushed by the gas stream. All these residues can be deposited on the operating surfaces of the valve element, specifically on the mutual contact surface between the valve shutter and the seat within which it engages, compromising proper valve closure.

Such a drawback is extremely undesirable, as it can lead to wear of the operating elements of the valve element over time, as well as cause a loss of pressure between the meter inlet and outlet, leading to malfunction.

In order to overcome such a drawback, some valve units present in known types of meters are provided with mechanical filtration elements, usually arranged before the gas stream enters the valve element and provided with one or more barriers made of a suitable material, adapted to retain the particles suspended in the stream passing therethrough. However, such devices are prone to clogging problems over time, leading to a significant loss of pressure between the meter inlet and outlet, compromising the proper use thereof.

The need is therefore felt for a gas meter provided with a reliable and easy-to-implement system to control the inflow of solid elements present in the gas stream entering the meter, such as dust or solid residues of various kinds.

SUMMARY

An object of the present invention is to overcome the drawbacks of the prior art.

In particular, it is an object of the present invention to provide a gas meter and a valve assembly having improved reliability over time, with particular regard to the accuracy of measuring the gas stream.

A further object of the present invention is to provide a valve assembly which is easy to manufacture and allows to reduce the fouling of the operating surfaces of the valve element present therein.

It is also an object of the present invention to provide a valve assembly whose seal is efficient and reliable over time, in particular in conditions of the presence of solid particles or dust within the gas stream which flows therein.

These and other objects of the present invention are achieved by a device incorporating the features of the accompanying claims, which form an integral part of the present description.

In accordance with a first aspect, the invention relates to a gas meter comprising a box-shaped casing defining therein a measuring compartment and comprising an inlet section and an outlet section for a gas stream. The meter further comprises a gas stream measuring device, arranged inside the measuring compartment, and a valve assembly housed inside said measuring compartment and connected to said inlet section. The valve assembly comprises a valve body which accommodates a shutter element cooperating with a sealing element having an inner diameter defining a gas stream passage opening through the valve body, the shutter element being movable between an open position and a closed position of said gas stream passage opening. The valve assembly further comprises a connecting element in flow communication with the inlet section and with the valve body to which it is connected, said connecting element comprising a stream conveyor device, substantially annular in shape, extending between an upper end portion thereof and a lower end portion thereof, and whose transverse section has a maximum inner dimension varying from said upper end portion to said lower end portion according to a non-increasing monotonic law in which, at said lower end portion, the maximum inner dimension of the transverse section of the conveyor device has a lower value than that of the inner diameter of the sealing element.

According to such a solution, a gas meter with improved reliability is obtained, with particular regard to the accuracy of gas stream measurement operations. In fact, by virtue of the presence of a device which adequately controls the inflow of solid elements, such as dust, entering the meter, the reliability of the valve body seal over time is ensured.

In accordance with some embodiments, the invention comprises a valve assembly for a gas meter comprising a valve body accommodating a shutter element cooperating with a sealing element having an inner diameter defining a gas stream passage opening through the valve body, said shutter element being movable between an open position and a closed position of said gas stream passage opening. The valve assembly further comprises a connecting element connected to the valve body and in flow communication therewith, comprising a stream conveyor device, substantially annular in shape, extending between an upper end portion thereof and a lower end portion thereof and whose transverse section has a maximum inner dimension varying from said upper end portion to said lower end portion according to a non-increasing monotonic law. At said lower end portion, the maximum inner dimension of the device of the transverse section of the conveyor device has a value less than that of the inner diameter of the sealing element.

According to such a solution, a robust and simple valve assembly is created, which minimises the fouling of the operating surfaces of the valve element present therein, thus ensuring an effective seal over time and thus significantly increasing the reliability of the valve assembly as a whole.

The present invention may have at least one of the following preferred features, taken individually or in combination with any other one of the preferred features described.

Preferably, the box-shaped body defines a correct mounting orientation. Preferably, when the box-shaped body is arranged in the correct mounting orientation, the valve assembly defines a gas stream path which extends in a substantially vertical direction.

Thereby, the corpuscles which are dragged by the gas stream can easily pass through the passage opening defined by the sealing element, either by suspension in the gas or by gravity.

Preferably, the valve assembly is placed between the inlet section and the measuring device.

Preferably, the lower end portion of the stream conveyor device is configured to be placed near, and spaced apart from, the passage opening defined by the sealing element.

Thereby, the gas stream through the conveyor device is effectively and precisely guided into the passage opening, avoiding undesirable deposits on the surfaces of the sealing element, thus ensuring the cleanliness thereof, so that the seal of the valve assembly is ensured over time.

Preferably, in the closed position, the shutter element extends above the plane tangent to the upper surface of the sealing element, for a distance H'.

Preferably, the lower end portion of the stream conveyor device is spaced from the plane tangent to the upper surface of the sealing element according to a distance H" whose value is greater than the value of the distance H'.

This has the advantage that the gas stream and the solid particles contained therein can be properly conveyed towards the valve body, effectively limiting any undesirable interference in the path of the stream itself.

Preferably, the shutter element is made of plastic.

Preferably, the sealing element has an annular shape, having an upper surface lying in a plane substantially perpendicular to the direction of the gas stream.

Preferably, the shutter element has a spherical, cylindrical or flat shape and is set in motion by means of an electric drive.

Preferably, the sealing element consists of a gasket.

Preferably, the conveyor device is made of thermoplastic resin.

Preferably, the conveyor device is made of acetal resin.

By virtue of the features of such materials, it is advantageous to obtain surfaces without asperities, so as to avoid undesirable pressure losses which could result from a turbulent motion of the gas fluid which laps them.

Preferably, the conveyor device is made in a single piece with the body of the connecting element.

Thereby, an advantage is obtained both in terms of saving on the cost of the material used to make the valve assembly and in terms of reducing the assembly time thereof.

Preferably, the conveyor device has a transverse section of circular shape substantially along the entire extension thereof.

Preferably, the conveyor device has a transverse section of variable shape, shaping the extension thereof.

Thereby, a device is made which adapts to the shape of the specific valve assembly with which it is associated, in particular to the inner profile of the connecting element present therein.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate. Moreover, for clarity of illustration, certain references may not be repeated in all drawings.

FIG. 3d is a schematic transverse sectional view of the valve assembly in FIG. 3a;

FIG. 4b is a schematic transverse sectional view of the valve assembly in FIG. 4a;

FIG. 5b is a schematic view from a second perspective of the element in FIG. 5a;

FIG. 5c is a schematic view from a third perspective of the element in FIG. 5a;

FIG. 6b is a schematic view from a second perspective of the element of FIG. 6a; and FIG. 6c is a schematic view from a third perspective of the element in FIG. 6a.

DETAILED DESCRIPTION OF THE EMBODIMENTS

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "comprises" and "includes" means "comprises or includes, but not limited to", unless otherwise indicated.

The invention is intended to be made and used in the presence of gravitational acceleration g, with respect to which the vertical direction and the horizontal directions are unambiguously defined. Furthermore, it is understood that the gravitational acceleration g unambiguously defines the terms 'above', 'high', 'upper' and the like, with respect to the terms 'below', 'low', 'lower' and the like.

The term "valve assembly" means the assembly formed by a valve element comprising a valve body provided with a shutter, a drive for moving the shutter, a connecting element for connecting the valve body to a user, and possibly a cover element, interposed between the valve body and the connecting element.

"Transverse section" of an element means a section carried out by means of a plane orthogonal to the longitudinal axis of the element.

"Maximum inner dimension" of an element having an annular shape means the maximum distance between opposite points of the mutually facing surfaces of such an annular element.

Figure 1:
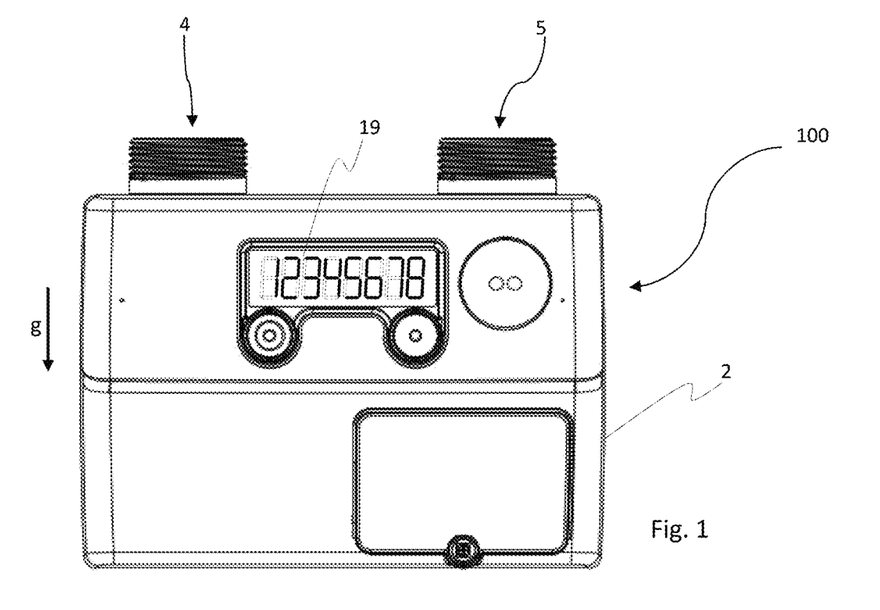
FIG. 1 is a front schematic view of a gas meter according to the invention.
Figure 2:
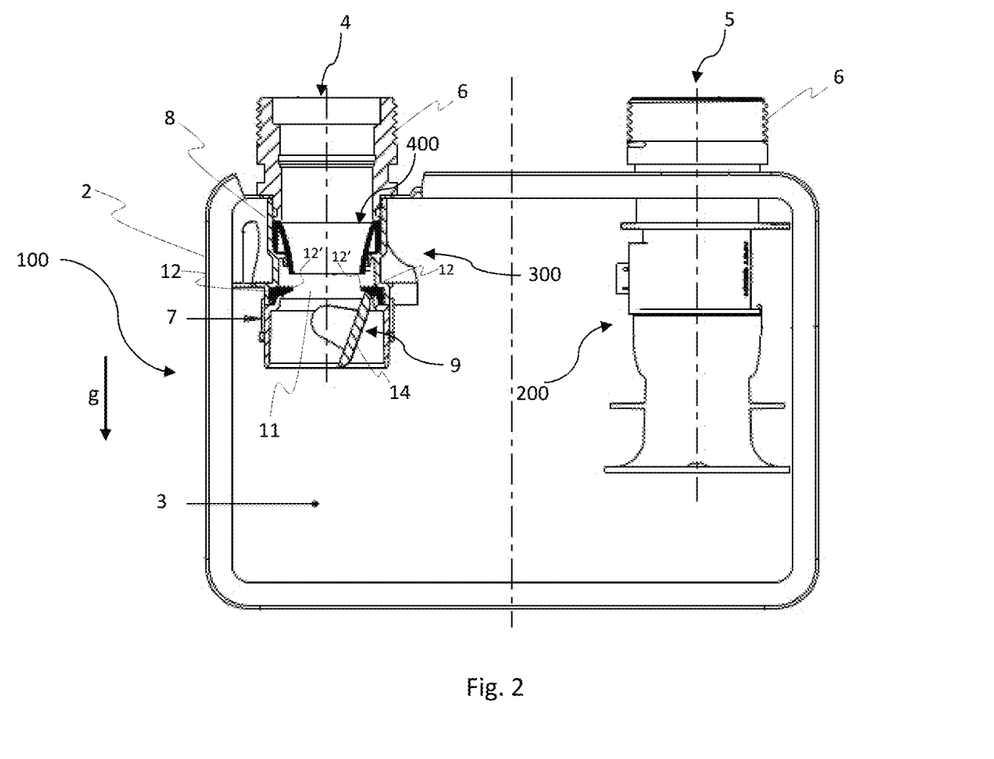
FIG. 2 is a schematic partial sectional view of the interior of the gas meter in FIG. 1.
Figure 3A:
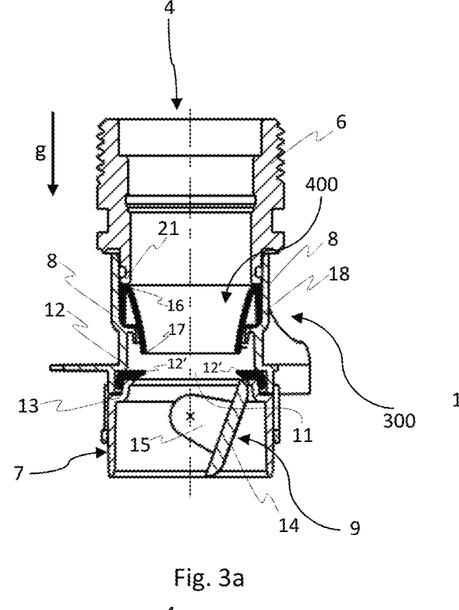
FIG. 3a is a schematic sectional view of a preferred embodiment of the valve assembly according to the present invention, in a first operating configuration, with some parts removed to better point out others.
Figure 3B:
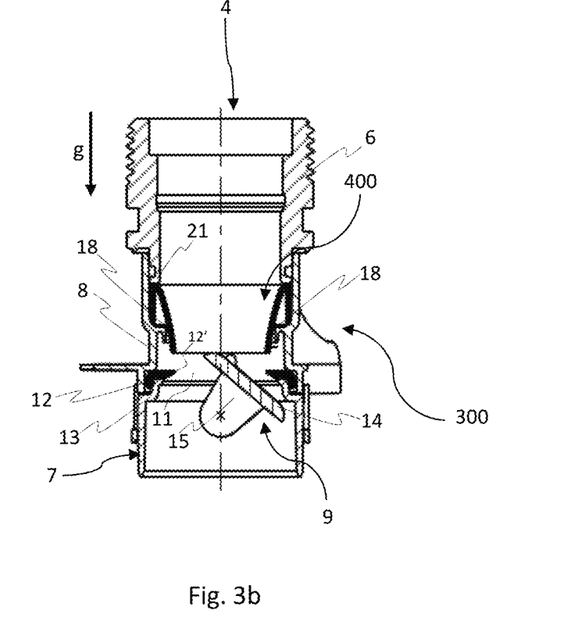
FIG. 3b is a schematic sectional view of the valve assembly in FIG. 3a, in a second operating configuration.
Figure 3C:
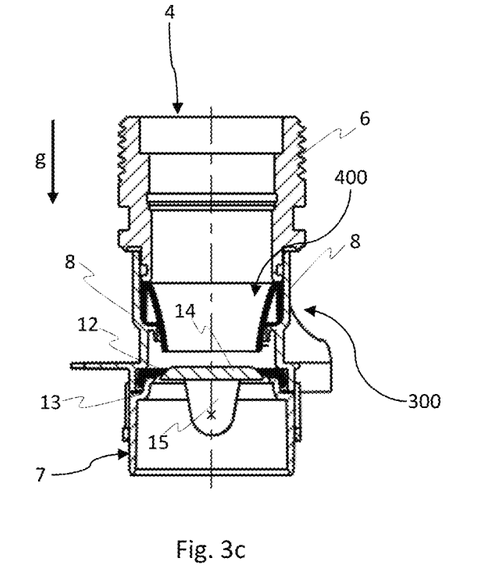
FIG. 3c is a schematic sectional view of the valve assembly in FIG. 3a, in a third operating configuration.
Figure 3D:
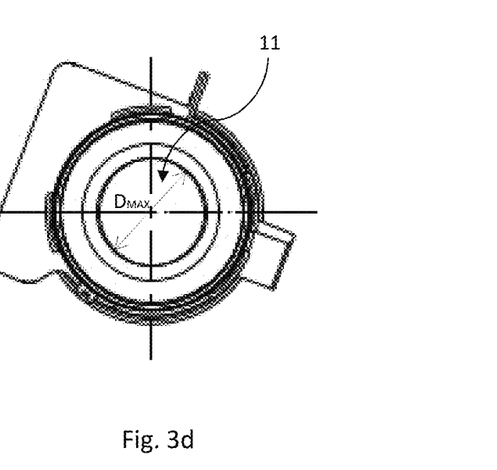
Figure 4A:
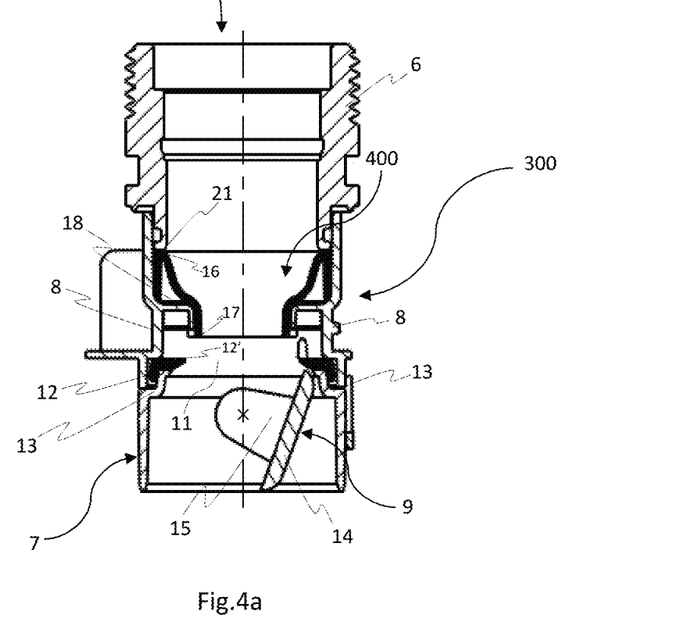
FIG. 4a is a schematic sectional view of an alternative embodiment of the valve assembly according to the present invention, in an operating configuration, with some parts removed to better point out others.
Figure 4B:
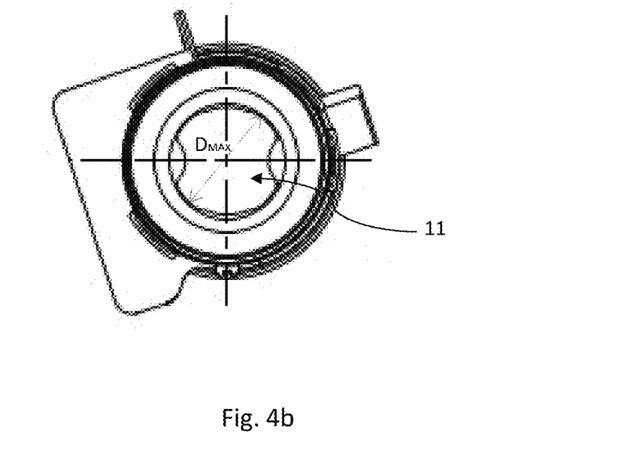

With reference to FIGS. 1 and 2, a gas meter according to the present invention is collectively referred to as 100.

The meter 100 comprises a box-shaped casing 2 which defines therein a measuring compartment 3 and has an inlet section 4 and an outlet section 5 through which a stream of gas flows into and out of the meter 100, respectively. According to a preferred configuration, each of such sections is provided with a threaded fitting 6, preferably consisting of a cylindrical sleeve, configured to connect the meter 100 to relative external pipes (not shown in the figures).

Preferably, the box-shaped casing 2 defines a single correct mounting orientation in which the meter 100 operates optimally according to the design parameters. For example, in the embodiment of the accompanying drawings, the correct mounting orientation of the box-shaped casing 2 is as shown in FIG. 1, in which the inlet section 4 and the outlet section 5 have vertical axes and the respective openings are arranged upwards.

Preferably the meter 100 further comprises a display 19. When the box-shaped casing 2 is in the correct mounting orientation, the information on the display 19 is correctly oriented to be readable by a user.

The gas meter 100 further comprises a measuring device 200 of the gas stream delivered, which has a tubular duct connected to the outlet section 5 and provided with a suitable sensor (not shown in the figures), configured to detect the volume of gas conveyed through the outlet section 5, in order for the meter 100 to measure the consumption of delivered gas.

Inside the measuring compartment 3, a valve assembly 300 is further arranged, placed in connection with the inlet section 4 of the gas stream, through which the gas inflow to the meter 100 is controlled.

As can be seen in the embodiment of FIG. 2, along the gas stream which crosses the meter 100, the valve assembly 300 is preferably placed between the inlet section 4 and the measuring device 200.

The valve assembly 300 comprises a valve body 7 connected to a connecting element 8 which is in turn connected to the threaded fitting 6, in fluid communication with the inlet section 4, so as to define a gas stream path. In other words, the valve assembly 300 defines a gas stream path which extends in a substantially vertical direction.

According to a preferred configuration, along said gas stream path, the valve body 7 has a shutter element 9 and a sealing element 12 configured to mutually engage to make a seal to the gas stream entering the meter 100.

More in detail, the sealing element 12 has an annular shape having an inner edge 12' arranged substantially along a circumference of inner diameter D, which defines a gas stream passage opening inside the valve body 7.

Preferably, the sealing element 12 is arranged to rest on an overhang portion 13 of the valve body 7, facing the connecting element 8 and has an upper surface lying in a plane substantially perpendicular to the direction of the gas stream, i.e., in a substantially horizontal plane. Suitable fastening means (not shown in the figures) such as an abutment ring and/or elastic means are arranged between the connecting element 8 and the sealing element 12 and are configured so as to obtain a compression action of the sealing element 12 in a direction orthogonal thereto, in particular by acting on the upper surface thereof, so as to ensure the stability of the positioning of the sealing element 12 as well as of the seal exerted thereby on the shutter element 9.

According to such a preferred configuration, the shutter element 9 then cooperates with the sealing element 12 so as to intercept the gas stream entering the valve assembly 300, when it is brought into a closed position of the passage opening 11; in such a position, the sealing element 12 partially covers the shutter element 9, obtaining a firm and sliding seal.

In a possible configuration, the sealing element 12 consists of a gasket configured such that one end thereof (coinciding with said edge 12') is directed towards the gas stream passage and defines the passage opening 11. According to such a shape, by virtue of the flexible features of the seal, it is advantageously possible to reduce the pressures acting on the shutter element 9 during its approach to the seal, in the movement between the open and closed position, thus reducing the friction between the elements in contact. Furthermore, the magnitude of the applied forces is advantageously reduced, resulting in a decrease in the energy required by the actuator to move the shutter element 9 and therefore an extension of the life of the battery associated therewith. The flexibility of the gasket further enables any tolerances between the mutual engagement surfaces of the shutter element 9 and the gasket to be optimally compensated, further improving the seal of the valve assembly 300 as a whole.

According to a preferred configuration, the shutter element 9 is made of thermoplastic material and has a head 14 shaped according to a spherical cap having a base diameter, the value of which is greater than the value of the inner diameter D of the sealing element 12. In an alternative configuration, the shutter element 9 is made of metal.

Preferably the head 14 is shaped according to a spherical segment with two bases.

According to an alternative configuration, the shutter element can have a spherical or cylindrical shape. In a further configuration, the shutter element can have a planar shape.

According to a preferred shape, the shutter element is shaped according to a spherical segment or has a spherical shape and is moved by means of an actuator (not shown in the drawings) to which it is associated by means of a control shaft which carries on the free end portion thereof at least one arm 15 associated with the shutter element 9, so as to transmit a rotational movement thereto. According to a configuration, the shutter element 9 is connected to the control shaft by means of two arms 15, orthogonal to the shaft and connected to diametrically opposite portions of the shutter element 9, at the greater base thereof. Thereby, the stability of the shutter element 9 is ensured, in particular during the movement between the open and closed positions; this leads to greater precision in the approach of the mutual surfaces of the shutter element 9 and the sealing element 12, ensuring the efficiency of the seal obtained. Preferably, said actuator is an electric motor, e.g., of the stepper or DC type.

According to the invention, the connecting element 8 comprises a stream conveyor device 400 which has a substantially annular shape and extends between an upper end portion 16 thereof and a lower end portion 17 thereof, according to a direction substantially coaxial to the direction of the grass stream introduced from the inlet section 4 of the meter 100. The conveyor device 400 preferably extends in a vertical direction, above the valve body 7.

Advantageously, the transverse section of the conveyor device 400 has a maximum inner dimension $D_{MAX}$ which varies from the upper end portion 16 to the lower end portion 17 according to a non-increasing monotonic law. Thereby, the conveyor device 400 is substantially shaped like a funnel, i.e., so that the section of the gas fluid path identified by the inner surface of the conveyor device 400, progressively narrows, until it has a minimum size at the lower end portion 17.

This design allows an effective channeling of the stream and any solid particles it may contain.

Preferably, the surface of the conveyor device 400 facing the gas stream does not have planar zones orthogonal to the direction of the gas stream, or cusps or discontinuities, thus allowing as much of a laminarization as possible of the gas stream flowing through the conveyor device 400.

According to the invention, the maximum inner dimension $D_{MAX}$ of the transverse section of the conveyor device 400 at the lower end portion 17 thereof has a value less than that of the inner diameter D of the sealing element 12.

Thereby, the gas stream which crosses the conveyor device 400 is effectively and precisely guided in the passage opening 11, so that no foreign particles or debris can settle on the surfaces of the sealing element 12, and thus ensuring the cleanliness thereof. More in particular, by virtue of the shape of the conveyor device 400, the dust and lighter particles suspended in the gas stream cross, together therewith, the passage opening 11 defined by the sealing element 12 without lapping the inner edge 12' of the latter. Furthermore, the larger corpuscles which are pushed by the gas stream fall by gravity through the passage opening 11 defined by the sealing element 12. Thereby, the seal obtained from the cooperation of the shutter element 9 with the sealing element 12 is always ensured over time.

Preferably, the conveyor device 400 is made of thermoplastic resin, preferably acetal resin or chromium-plated metal; such materials advantageously allow to manufacture an element provided with features such as high mechanical strength, stiffness and hardness, dimensional stability as well as good sliding properties and resistance to wear. Such types of materials also allow to obtain surfaces without roughness, so that undesirable pressure losses due to the turbulent motion of the gas fluid which laps them can be avoided.

According to a preferred embodiment, the lower end portion 17 of the conveyor device 400 is arranged facing the sealing element 12, and separated therefrom according to a distance which allows the free movement of the shutter element 9 during the movement thereof between the open and closed positions; in essence, the conveyor device 400 is configured so that the lower end portion 17 is positioned as close as possible to the inner edge 12' of the sealing element 12, but spaced therefrom so as to avoid interference between the shutter element 9 and the conveyor device 400.

In particular, according to a preferred configuration, in the closed position, the shutter element 9 extends above a plane tangent to the upper surface of the sealing element 12 for a distance H'. Preferably, the lower end portion 17 of the stream conveyor device 400 is spaced from the plane tangent to the upper surface of the sealing element 12 according to a distance H" whose value is greater than the value of the distance H'.

This advantageously allows the gas stream and the particles contained therein to be suitably conveyed towards the valve body 7, through the passage opening 11 defined by the inner edge 12', further limiting the possibility of dust and solid elements settling on the surfaces of the elements forming the valve assembly 300, in particular in the interface area between the shutter element 9 and the sealing element 12. Furthermore, according to such a configuration, interference in the path of the stream itself is advantageously limited, and consequently turbulence which can lead to unwanted pressure losses is avoided.

According to a preferred embodiment of the present invention, as shown for example in FIGS. 3a-3c and 4, the conveyor device 400 is arranged in the body of the valve assembly 300 so as to be received and restingly supported by the connecting element 8. Preferably, the connecting element 8 has an abutment portion 18 at which the conveyor device 400 is associated with the connecting element 8. In particular, such an association can be obtained by means of a simple support constraint, or instead include the presence of connecting means (not shown in the figures), such as bayonet couplings or elastic means.

Further advantageously, the conveyor device 400 is configured so that the upper end portion 16 is arranged near an inlet section of the connecting element 8, so as to be in contact with a lower edge 21 of the threaded connection 6, when the valve assembly 300 is connected with the connection 6 itself. Thereby, the inner surfaces of the conveyor device 400, i.e., those facing the gas stream, are smoothly connected to the inner surfaces of the threaded fitting 6, so as to substantially reduce the possibility of generating undesirable turbulence in the stream and consequently lead to a loss of pressure which may result in the malfunction of the meter 100.

Thereby, a system is created in a simple and economical manner, which allows the valve assembly 300 to be kept efficient, as it is preserved from damage and/or malfunction due to possible deposits of dust therein. Such a system, using a simple and robust device, is extremely reliable over time as it is not substantially subject to wear and the operation thereof is independent of the operating conditions of the other elements forming the system in which it is located.

The invention thus conceived is susceptible to several modifications and variations, all falling within the scope of the inventive concept.

For example, the conveyor device 400 can be made in a single piece with the body of the connecting element 8 (configuration not shown in the drawings), with an obvious advantage of saving time and assembly costs, as well as material used to make the assembly itself.

Figure 5A:
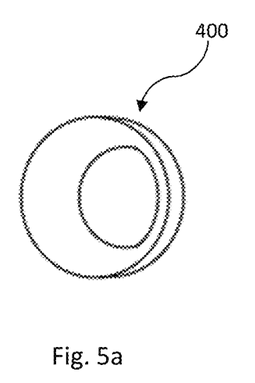
FIG. 5a is a schematic view from a first perspective of an element of the valve assembly according to the invention, in a first embodiment.
Figure 5B:
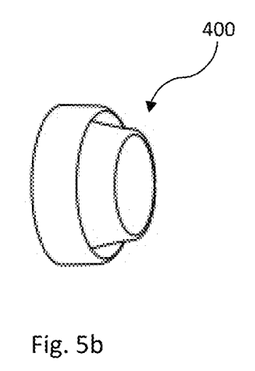
Figure 5C:
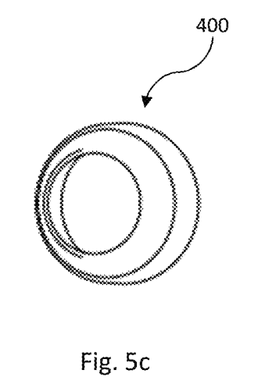
Figure 6A:
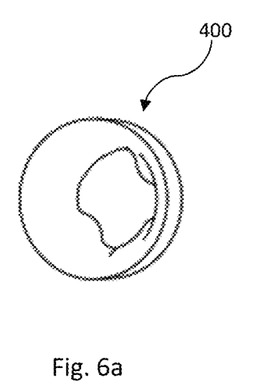
FIG. 6a is a schematic view from a first perspective of an element of the valve assembly according to the invention, in a second embodiment.
Figure 6B:
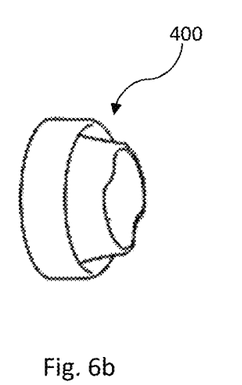
Figure 6C:
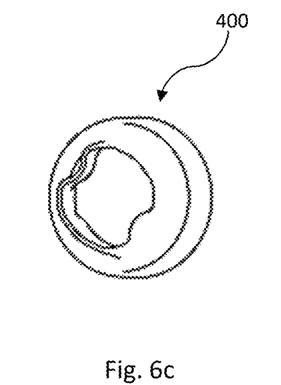

The conveyor device 400 can be made in different shapes, based on specific application requirements, subject to the technical features which identify it, according to the invention. In fact, the solution envisaged is suitable for a variety of applications, simply by adapting the profile of the conveyor device 400 based on the shape of the valve elements with which it is associated. For example, it may be characterised by a transverse section which is circular (as shown, for example, in FIGS. 5a-5c) or shaped (as shown, for example, in FIGS. 6a-6c) in the case where it is necessary to adapt the shape thereof to a particular inner profile of the valve body.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A gas meter, comprising:
   a box-shaped casing defining therein a measuring compartment and comprising an inlet section and an outlet section for a gas stream;
   a measuring device of the gas stream, arranged inside the measuring compartment;
   a valve assembly housed inside said measuring compartment and connected to said input section, said valve assembly comprising:
      a valve body which accommodates a shutter element cooperating with a sealing element having an inner diameter defining a passage opening of the gas stream through the valve body, said shutter element being movable between an open position and a closed position of said gas stream passage opening; and
      a connecting element in flow communication with the inlet section and the valve body to which it is connected;
   wherein said connecting element comprises a stream conveyor device, of substantially annular shape, extending between an upper end portion thereof and a lower end portion thereof and whose transverse section has a maximum inner dimension varying from said upper end portion to said lower end portion according to a non-increasing monotonic law;
      and wherein at said lower end portion, the maximum inner dimension of the transverse section of the conveyor device has a value less than that of the inner diameter of the sealing element.

2. The gas meter according to claim 1, wherein the box-shaped body defines a correct mounting orientation, and wherein, when the box-shaped body is arranged in the correct mounting orientation, the valve assembly defines a path of the gas stream which extends in a substantially vertical direction.

3. The gas meter according to claim 1, wherein the lower end portion of the stream conveyor device is configured to be placed near the passage opening defined by the sealing element, and spaced therefrom.

4. The gas meter according to claim 1, wherein, in the closed position, the shutter element extends above the plane tangent to the upper surface of the sealing element, for a distance H'.

5. The gas meter according to claim 4, wherein the lower end portion of the stream conveyor device is spaced from the plane tangent to the upper surface of the sealing element according to a distance H" whose value is greater than the value of the distance H'.

6. The gas meter according to claim 1, wherein the shutter element is made of plastic.

7. The gas meter according to one or more of claim 1, wherein the sealing element has an annular shape having an upper surface lying in a plane substantially perpendicular to the gas stream direction.

8. The gas meter according to claim 1, wherein the shutter element has a spherical or cylindrical shape and is rotated by an electrical drive.

9. The gas meter according to claim 1, wherein the sealing element comprises a gasket.

10. The gas meter according to claim 1, wherein said conveyor device is made of thermoplastic resin.

11. The gas meter according to claim 1, wherein the valve assembly is placed between the inlet section and the measuring device.

12. The gas meter according to claim 1, further comprising a display wherein, when the box-shaped casing is in the correct mounting orientation, the information on the display is correctly oriented to be readable by a user.

* * * * *